United States Patent
Kawasaki et al.

(10) Patent No.: US 6,569,936 B1
(45) Date of Patent: May 27, 2003

(54) RUBBER COMPOSITION FOR A CONVEYOR BELT

(75) Inventors: Masaaki Kawasaki, Ichihara (JP); Takashi Hakuta, Ichihara (JP); Hidenari Nakahama, Ichihara (JP); Tetsuo Tojo, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 09/717,275

(22) Filed: Nov. 22, 2000

Related U.S. Application Data

(63) Continuation of application No. 09/073,987, filed on May 7, 1998, now abandoned.

(30) Foreign Application Priority Data

May 7, 1997 (JP) .............................................. 9-117240

(51) Int. Cl.⁷ ................................................. C08K 3/04
(52) U.S. Cl. ...................... 524/495; 524/474; 524/481; 524/484
(58) Field of Search ................................ 524/495, 474, 524/481, 484

(56) References Cited

U.S. PATENT DOCUMENTS 5,733,983 A    3/1998  Hakuta et al.

FOREIGN PATENT DOCUMENTS

| EP | 0595551 A | 5/1994 |
|---|---|---|
| EP | 0765908 A | 4/1997 |
| WO | WO9004617 A | 5/1990 |

*Primary Examiner*—Edward J. Cain
(74) *Attorney, Agent, or Firm*—Burns, Doane, Swecker & Mathis, LLP

(57) ABSTRACT

According to the present invention, there is provided a rubber composition for a conveyor belt comprising (A) 100 parts by weight of an ethylene/α-olefin containing 3 to 20 carbon atoms/non-conjugated polyene copolymer rubber containing a diene unit derived from special non-conjugated dienes, (B) 0.5 to 15 parts by weight of an organic peroxide, (C) 30 to 80 parts by weight of a carbon black and (D) 5 to 25 parts by weight of a softening agent.

This rubber composition provides excellent mechanical strength, heat resistance (including heat aging resistance), abrasion resistance and roll processability. It is especially preferred to convey a sintered product, a coke, a cement, clinker and quicklime.

7 Claims, No Drawings

RUBBER COMPOSITION FOR A CONVEYOR BELT

This is a continuation of applicants' prior application Ser. No. 09/073,987, filed May 7, 1998 now abandoned to which priority is claimed.

BACKGROUND OF THE INVENTION

1. (Technical Field to which the Invention Belongs)

The present invention relates to a rubber composition for a heat-resistant belt having excellent mechanical strength, heat resistance (including heat aging resistance), abrasion resistance, and roll processability, and more specifically to a conveyor belt having heat resistance and abrasion resistance for conveying a sintered product, a coke, a cement, a clinker, a quicklime, etc.

2. (Prior Art)

Since an ethylene/propylene copolymer rubber (EPM) and an ethylene/propylene/diene copolymer rubber (EPDM) do not have an unsaturated bond in the main chain, the above copolymers have better heat resistance and weatherbility than widely used diene-type rubbers and are used in many products such as automotive parts and industrial parts.

It is known that EPM and EPDM change their heat resistance (heat aging resistance) according to their compositions. It is known that as the ethylene content becomes higher, roll processability and low temperature flexibility become poorer. If the diene content is small, it is known that the amount of the vulcanizer should be increased, but obtained rubbers have excellent heat resistance (heat aging property).

It is known that as a method of vulcanization, vulcanization with an organic peroxide gives better heat resistance (heat aging property) than vulcanization with sulfur.

The conveyor belt for conveying a high temperature product such as a sintered product, a coke, a cement, a clinker, a quicklime, etc. should withstand the load of the conveyed product or the heat emitted from the conveyed product for long periods of time. Especially, the above conveyor belt should have heat resistance and abrasion resistance.

However, the heat-resistant belt obtained by crosslinking the conventional rubber composition for a heat-resistant belt has insufficient heat resistance (heat aging resistance) in conveying such high temperature product. Furthermore, since the conventional rubber composition. for a heat-resistant belt contains EPM as a base, it is still unsatisfactory because a large amount of a vulcanizer is required to obtain a high crosslinking density.

The object of the present invention is to solve the problem belonging to the conventional art, and to provide a rubber composition for a conveyor belt which belt is suitable for conveying a high temperature product and has excellent heat resistance and abrasion resistance.

Another object of the present invention is to provide a crosslinked product having a high crosslinking density and excellent heat resistance by using a smaller amount of a crosslinking agent, especially a conveyor belt.

SUMMARY OF THE INVENTION

According to the present invention, there is provided a rubber composition for a conveyor belt comprising (A) 100 parts by weight of an ethylene/an α-olefin containing 3 to 20 carbon atoms/a conjugated polyene copolymer rubber having a diene unit derived from a non-conjugated diene of general formula (1)

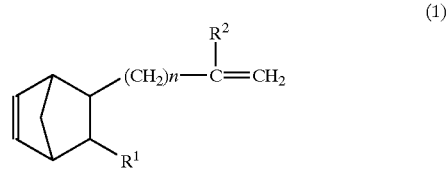

(1)

wherein n is an integer of 0 to 10, $R^1$ represents a hydrogen atom or an alkyl group containing 1 to 10 carbon atoms, and $R^2$ represents a hydrogen atom or an alkyl group containing 1 to 5 carbon atoms, or a non-conjugated diene of general formula (2)

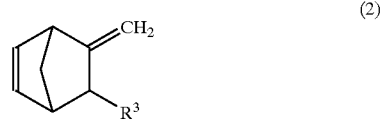

(2)

$R^3$ represents a hydrogen atom or an alkyl group containing 1 to 10 carbon atoms, B) 0.5 to 15 parts by weight of an organic peroxide, C) 30 to 80 parts by weight of carbon black and (D) 5 to 25 parts by weight of a softening agent.

In the above-mentioned rubber composition, the following embodiments 1 to 3 are preferred.

1. In the ethylene/α-olefin containing 3 to 20 carbon atoms/non-conjugated polyene copolymer rubber (A), the α-olefin is propylene, and the ethylene/propylene mole ratio is from 50/50 to 72/28.

2. In the ethylene/α-olefin containing 3 to 20 carbon atoms/non-conjugated polyene copolymer rubber (A), the α-olefin contains 4 to 20 carbon atoms, and the ethylene/α-olefin mole ratio is from 60/40 to 82/18.

3. The ethylene/α-olefin containing 3 to 20 carbon atoms/non-conjugated polyene copolymer rubber (A) has (i) a non-conjugated polyene content of 0.2 to 4% by weight, and (ii) an intrinsic viscosity (η), measured in decalin at 135° C., of 1.5 to 3 dl/g.

According to the present invention, a conveyor belt obtained by crosslinking the above rubber composition is also provided.

DETAILED DESCRIPTION OF PREFERRED EMBODIMENTS OF THE INVENTION

The rubber composition of the present invention for a conveyor belt is characterized by comprising (A) 100 parts by weight of an ethylene/α-olefin containing 3 to 20 carbon atoms/non-conjugated polyene containing a diene unit derived from the non-conjugated diene of the above general formula (1) or (2), (B) 0.5 to 15 parts by weight of an organic peroxide, (C) 30 to 80 parts by weight of carbon black and (D) 5 to 25 parts by weight of a softening agent.

The non-conjugated diene in the copolymer rubber (A) used in the present invention is limited to that comprising a norbornene compound having a chemical structure of the above general formula (1) or (2) for the following reasons.

Cyclic non-conjugated polyenes include various types, for example, a type having a norbornene skeleton and a type having a dicyclopentadiene skeleton. If 5-ethylidene-2-norbornene (ENB) or dicyclopentadiene (DCPD) is used, when the non-conjugated polyene content of the copolymers is within the range of the present invention, it is difficult to increase the heat resistance (heat aging resistance) of the resulting crosslinked product.

On the other hand, if 5-vinyl-2-norbornene (VNB) or 5-(1-butenyl)-2-norbornene (BNB) represented by the following chemical structure:

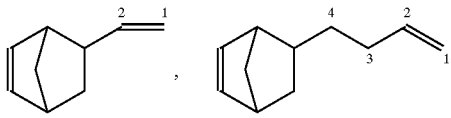

is used, the use of a small amount of crosslinking agent enables the crosslinking to proceed effectively when the copolymer is crosslinked with a peroxide. In addition, the resulting crosslinked product has markedly good heat resistance (heat aging resistance) as well as excellent abrasion resistance (see Examples given below).

The following thought will be derived from the above fact.

When the non-conjugated polyene is copolymerized, one ethylenically unsaturated bond participates in copolymerization, and the remaining ethylenically unsaturated bond remain in the copolymer chains. In the case of cyclic non-conjugated polyenes represented by the general formula (1) and the general formula (2), the ethylenically unsaturated bonds outside the ring remain in greater amounts although detailed reasons are not known. Generally, ethylenically unsaturated bonds existing outside the ring have a larger degree of freedom than the ethylenically unsaturated bonds existing in the ring, and have a higher reactivity. Hence, in the copolymer rubber (A) of the present invention, by using a smaller amount of a crosslinking agent, crosslinking takes place effectively.

Since in a copolymer rubber prepared from a conjugated polyene, an ethylenically unsaturated bond remaining after vulcanization exists in the main chain, the unsaturated bonding in the main chain will adversely affect the heat resistance (heat aging resistance). On the other hand, since the copolymer rubber (A) of the present invention uses a cyclic non-conjugated diene represented by the general formula (1) or (2), the unsaturated bond which did not participate in the polymerization reaction but remained in the copolymer existed outside of the main chain, and after crosslinking of the coplymer rubber (A), the unsaturated bond still existed outside the main chain. Accordingly, the copolymer rubber (A) is considered to have excellent heat resistance (heat aging resistance).

The other components of the present invention, namely the organic peroxide (B), the carbon black (C) and the softening agent (D), are necessary components for obtaining the crosslinked product as a conveyor belt.

The rubber composition of the present invention can be subjected to a crosslinking reaction effectively in comparison with the amount of the organic peroxide to achieve a high crosslinking density.

In the rubber composition of the present invention, the carbon black performs a wide function and effect as a filler, a heat resistance imparting agent, and a coloring agent etc.

In the rubber composition of the present invention, the softening agent can increase the moldability of the rubber composition and can give a molded product having complex shapes.

Preferred embodiments of the present invention are especially said 1 to 3. The preferred embodiments 1 and 2 define the composition ratio of ethylene/α-olefin having 3 to 20 carbon atoms in the copolymer. If the composition ratio is within the above range, it is possible to give an excellent rubber composition which has excellent heat resistance and abrasion resistance as well as excellent processability, rubbery characteristics and weatherability.

Item (i) of the preferred embodiment 3 defines the content of the non-conjugated polyene unit in the copolymer. If this value defined by (i) is too low as compared with the defined value, the heat resistance (heat aging resistance) is lowered, the elongation becomes too large and the permanent set tends to increase. Furthermore, if the value too large, the environmental deterioration property tends to be lowered, and the cost becomes high disadvantageously. Hence, the content of the non-conjugated polyene outside the defined range is not preferrred.

Item (ii) of the preferred embodiment 3 defines the molecular weight of the copolymer. If the intrinsic viscosity ($\eta$) is lower than the defined range, properties such as mechanical properties of the copolymer tend to be lowered. If the intrinsic viscosity is higher than the defined range, processability tends to be lowered.

According to the above statement, the problems of the conventional art have been overcome, and a rubber composition for a conveyor belt which has excellent heat resistance (heat aging resistance) and abrasion resistance, excellent properties and a good balance of heat resistance and low temperature flexibility can be provided.

Ethylene/α-olefin/non-conjugated polyene copolymer rubber (A)

In the ethylene/α-olefin/non-conjugated polyene copolymer rubber (A), the mole ratio (a/b) of ethylene (a) to the α-olefin (b) containing 3 to 20, preferably 3 to 12, more preferably 3 to 8 carbon atoms, if the α-olefin is propylene, may be from 50/50 to 72/28, preferably from 55/45 to 68/32 especially preferably from 55/45 to 65/35. If the α-olefin is an α-olefin having 4 to 20 carbon atoms, the mole ratio of ethylene (a) to the α-olefin (b) may be from 60/40 to 82/18, preferably from 65/35 to 78/22, especially preferably from 65/35 to 73/27.

If the ethylene/propylene mole ratio exceeds 72/28, or the mole ratio of ethylene/α-olefin containing 4 to 20 carbon atoms exceeds 82/18, roll processability tends to be lowered. On the other hand, if the mole ratio is lower than 50/50 or 60/40, the heat resistance of the copolymer rubber tends to be lowered.

Examples of the α-olefin (b) having 3 to 20 carbon atoms specifically include propylene, butene-1, pentene-1, hexene-1, heptene-1, octene-1, nonene-1, decene-1, undecene-1, dodecene-1, 9-methyl-dodecene-1, and 11-methyl-dodecene-1.

In the present invention, the above α-olefins may be used singly or as a mixture of at least two monomers. Among the above α-olefins, propylene, butene-1, hexene-1, octene-1, and decene-1 are preferably used. Especially butene-1 and octene-1 are preferably used.

The non-conjugated polyene (c) used in the present invention comprises a diene having a norbornene structure, namely the norbornene structure represented by the general formula (1) or (2).

Examples of the alkyl group having 1 to 10 carbon atoms as $R^1$ in the general formula (1) include a methyl group, an ethyl group, a propyl group, an isopropyl group, an n-butyl group, an isobutyl group, a sec-butyl group, a t-butyl group, an n-pentyl group, an isopentyl group, a t-pentyl group, a neopentyl group, a heptyl group, an octyl group, an isooctyl group, a nonyl group and a decyl group.

Specific examples of the alkyl group having 1 to 5 carbon atoms as $R^2$ in the general formula (1) may be the same alkyl groups as mentioned with regard to the alkyl groups $R^1$ in the general formula (1).

Specific examples of the alkyl group having 1 to 10 carbon atoms as $R^3$ in the general formula (2) may be the same alkyl group as mentioned with regard to the alkyl groups $R^1$ in the general formula (1).

Specific examples of the norbornene compounds represented by the general formula (1) or (2) include 5-methylene-2-norbornene, 5-vinyl-2-norbornene, 5-(1-propenyl)-2-norbornene, 5-(isopropenyl)-2-norbornene, 5-(2-ethyl-vinyl)-2-norbornene, 5-(1-butenyl)-2-norbornene, 5-(2-methyl-1-propenyl)-2-norbornene, 5-(1-pentenyl)-2-norbornene, 5-(2-methyl-1-butenyl)-2-norbornene, 5-(1-hexenyl)-2-norbornene, 5-(2-methyl-1-pentenyl)-2-norbornene, 5-(2,3-dimethyl-1-butenyl)-2-norbornene, 5-(2-ethyl-1-butenyl)-2-norbornene, 5-(1-heptenyl)-2-norbornene, 5-(2-methyl-1-hexenyl)-2-norbornene, 5-(2,3-dimethyl-1-pentenyl)-2-norbornene, 5-(2-ethyl-1-pentenyl)-2-norbornene, 5-(1-octenyl)-2-norbornene, 5-(2-methyl-1-heptenyl)-2-norbornene, 5-(2,3-dimethyl-1-hexenyl)-2-norbornene, 5-(5-ethyl-1-hexenyl)-2-norbornene, 5-(2,3,4-trimethyl-1-pentenyl)-2-norbornene, 4-methyl-5-methylene-2-norbornene, 4-methyl-5-vinyl-2-norbornene and 4-ethyl-5-vinyl-2-norbornene.

Preferred examples are 5-methylene-2-norbornene, 5-vinyl-2-norbornene, 5-(1-propenyl)-2-norbornene, 5-(1-butenyl)-2-norbornene, 5-(1-pentenyl)-2-norbornene, 5-(1-hexenyl)-2-norbornene, 5-(1-heptenyl)-2-norbornene and 5-(1-octenyl)-2-norbornene.

Other non-conjugated polyenes may be used as a mixture with the above non-conjugated dienes so long as the intended properties may not be impaired.

Specific examples of the non-conjugated polyenes include chain-like non-conjugated dienes such as 1,4-hexadiene, 3-methyl-1,4-hexadiene, 4-methyl-1,4-hexadiene, 5-methyl-1,4-hexadiene, 4,5-dimethyl-1,4-hexadiene and 7-methyl-1,6-octadiene, cyclic non-conjugated dienes such as methyltetrahydroindene, 5-ethylidene-2-norbornene, 5-isopropylidene-2-norbornene and 6-chloromethyl-5-isopropenyl-2-norbornene, and trienes such as 2,3-diisopropylidene-5-norbornene, 2-ethylidene-3-isopropylidene-5-norbornene, 2-propenyl-2,2-norbornadiene, and 5-vinylidene-2-norbornene.

As stated above, the content of the non-conjugated polyene is preferably 0.2 to 4% by weight in the copolymer rubber (A) of the present invention.

Especially, the norbornene compounds represented by the general formula (1) or (2) may preferably be used so that the iodine value (g/100 g) of the resulting copolymer rubber (A) may become 0.5 to 50, especially 0.8 to 30, more especially 1 to 20, most especially 1.5 to 15. If the iodine value is smaller than the above range, the crosslinking efficiency of the resulting composition tends to be lowered. If the iodine value of the resulting composition is larger than the above range, the environmental degradability resistance tends to be lowered and the cost of the composition tends to become disadvantageous. Specifically, these norbornene compounds may be copolymerized in an amount of 0.5 to 10% by weight, especially 1 to 5% by weight, per the whole monomer component.

Other non-conjugated polyenes than the norbornene compound represented by the general formula (1) or (2) can also be used preferably, when the above range of the iodine value is kept. Concretely, said other non-conjugated polyenes may be copolymerized in an amount of not larger than 5% by weight, preferably not larger than 3% by weight, per the whole monomer component.

As stated above, the copolymer rubber (A) of the present invention may have an intrinsic viscosity ($\eta$), measured in decalin, of usually 1.5 to 3 dl/g, more preferably 1.8 to 2.7 dl/g, most preferably 2 to 2.7 dl/g.

The copolymer rubber (A) of the present invention can be produced by known methods. For example, the copolymer rubber (A) can be obtained by copolymerizing (a) ethylene, (b) an $\alpha$-olefin containing 3 to 20 carbon atoms, and (c) a non-conjugated polyene in the presence of a Ziegler catalyst using hydrogen as a molecular weight adjusting agent.

Organic Peroxide (B)

Examples of the organic peroxide (B) used in the present invention include dialkyl peroxides such as dicumyl peroxide, di-t-butyl peroxide, di-t-butyl peroxy-3,3,5-trimethylcyclohexane, t-butyl cumyl peroxide, di-t-amyl peroxide, t-butyl hydroperoxide, 2,5-dimethyl-2,5-di(t-butylperoxy)hexyne-3,2,5-dimethyl-2,5-di(benzoylperoxy)hexane, 2,5-dimethyl-2,5-mono(t-butylperoxy)hexane and $\alpha,\alpha'$-bis(t-butylperoxy-m-isopropyl)benzene; peroxy esters such as t-butylperoxyacetate, t-butylperoxyisobutyrate, t-butylperoxypivalate, t-butylperoxymaleate, t-butylperoxyneodecanoate, t-butylperoxybenzoate, di-butylperoxyphthalate and 1,1-bis-t-butylperoxy-3,3,5-trimethylcyclohexane; ketone peroxides such as dicyclohexanoneperoxide; and mixtures of the above compounds.

The use of organic peroxides in which the temperature which gives a half-value period of 1 minute is in a range of 130° C. to 200° C. is preferred. Especially, dicumyl peroxide, di-t-butylperoxide, di-t-butylperoxy-3,3,5-trimethylcyclohexane, t-butyl cumyl peroxide, di-t-amyl peroxide, t-butyl hydroperoxide, 2,5-dimethyl-2,5-di(t-butylperoxy)hexyn-3,2,5-dimethyl-2,5-mono(t-butylperoxy)hexane, and 1,1-bis-t-butylperoxy-3,3,5-trimethyl-cyclohexane are preferably used.

The organic peroxide is used in an amount of 0.5 to 15 parts by weight, preferably 1 to 10 parts by weight, per 100 parts by weight of the copolymer (A) of the present invention. It is desirable to determine the most preferred amount from the above range according to the required physical value.

Carbon Black (C)

In the composition of the present invention, carbon black is an essential component.

By using carbon black, the processability of the composition can be increased to give a rubber composition for a conveyor belt having increased mechanical properties such as tensile strength, tear strength and abrasion resistance.

The amount of the carbon black used is 30 to 80 parts by wieght, preferably 30 to 70 parts by weight, most preferably 40 to 70 parts by weight, per 100 parts by weight of the copolymer rubber (A). If the carbon black is compounded in an amount larger than the above ranges, it is inconvenient that the dynamic ratio (dynamic modulus of elasticity/static modulus of elasticity) increases. If the amount of the carbon black is smaller than the specified range, the processability and mechanical properties will be lowered.

Examples of carbon black include SRF, GPF, FEF, MAF, HAF, ISAF, SAF, FT and MT, which are widely known themselves. These carbon blacks may be used singly or in combination with each other. Or they may be surface coated with silane coupling agents.

Softening Agent (D)

In the composition of the present invention, a softening agent is an essential component.

By using a softening agent, the processability of the composition can be increased, and it is possible to mold complex shapes.

The softening agent is added in an amount of 5 to 25 parts by weight, preferably 5 to 20 parts by weight, most preferably 5 to 15 parts by weight, per 100 parts by weight of the copolymer rubber (A). If the softening agent is compounded in a larger amount than the above range, the softening agent bleeds out, and therefore, the properties of the surface of a molded product are lowered and the cost becomes disadvantageous. If the amount of the plasticizer is smaller than the above range, the processability will be lowered.

Examples of the softening agent include paraffinic, naphthenic and aromatic mineral oils. Particularly preferred plasticizers may be paraffinic oils.

Concretely examples of the softening agent include petroleum-type softening agents such as process oils, lubricant oils, paraffins, liquid paraffins, petroleum asphalt and vaseline, coal tar-type softening agents such as coal tar and coal tar pitch, fatty acid oil-type softening agents such as castor oil, linseed oil, rape oil and coconut oil, waxes such as tall oil, factice, bees wax, carnauba wax and lanolin. Among them, petroleum type softening agents are preferably used. Especially, process oils are preferably used.

[Other Compounding Agents]

The rubber composition of the present invention contains the components (A) to (D) as essential components. So long as the object of the present invention is not impaired, conventionally known rubber compounding agents, such as crosslinking aids, fillers, plasticizers, tackifiers, aging preventing agents, processing aids and foaming agents may be properly compounded with the above components.

Crosslinking Aids

Examples of the crosslinking aids include so called polyfunctional monomers, for example sulfur, quinonedixime compounds such as p-quinonedioxime, (meth)acrylate compounds such as trimethylolpropane triacrylate, ethyleneglycol dimethacrylate and polyethylene glycol dimethacrylate, allyl compounds such as diallyl phthalate and triallyl cyanurate, maleimide compounds such as m-phenylene bismaleimide, and divinylbenzene.

These crosslinking aids may be used in an amount of 0.5 to 2 moles, preferably in an equimolar amount, per 1 mole of the organic peroxide.

Fillers

In the present invention, as required, other inorganic fillers, such as silica, calcium carbonate, talc, finely divided silicate salts, and clay may be used conjointly with the carbon black. In this case, the total amount of the filler including the carbon black should not exceed the below-mentioned range, and the compounded amount of the carbon black should be within the aforesaid range.

The fillers have an effect of increasing mechanical properties of the crosslinked rubber, for example, tensile strength, tearing strength and abrasion resistance.

The fillers are used to increase the hardness of the rubber product or lowering the cost without so much affecting the properties of the rubber products.

Examples of such fillers include, more preferably, light calcium carbonate, heavy calcium carbonate, talc and clay.

The type and the compounded amount of the fillers may be properly selected in accordance with the uses.

The compounded amount is usually at most 200 parts by weight, preferably at most 100 parts by weight, most preferably at most 50 parts by weight, per 100 parts by weight of the ethylene/α-olefin/polyene copolymer rubber (A).

Plasticizer

Examples of the plasticizer include glycols; fatty acids, fatty acid ester and fatty acid salts such as stearic acid, ricinoleic acid, palmitic acid, barium stearate, calcium stearate and zinc laurate.

The type and the compounded amount of the plasticizers may be properly selected in accordance with the uses. The compounded amount is usually, not larger than 10 parts by weight per 100 parts by weight of the ethylene/α-olefin/polyene copolymer rubber (A).

Tackifier

Examples of the tackifiers include rosin-type tackifiers; synthetic polymeric substances such as petroleum resins, atactic polypropylene and coumarone indene resins.

The type and the compounded amount of the tackifiers may be properly selected in accordance with the uses. The compounded amount is usually, not larger than 10 parts by weight per 100 parts by weight of the ethylene/α-olefin/polyene copolymer rubber (A).

Aging Preventing Agent

The rubber composition of the present invention shows excellent heat resistance and durability even if an aging preventing agent is not used. But if an aging preventing agent is used, the life of the product can be prolonged usually in the same way as in usual rubbers. The aging preventing agents used in this case may include amine-type aging preventing agents, phenolic aging preventing agents, and sulfur-type aging preventing agents.

Examples of the amine-type aging preventing agents include nathylamine-type aging preventing agents such as phenyl-α-naphthylamine and phenyl-β-naphthylamine; diphenylamine-type aging preventing agents such as p-(p-toluene sulfonylamide)-diphenylamine, 4,4-(α,α-dimethylbenzyl)diphenylamine, 4,4'-dioctyldiphenylamine, a high temperature reaction product of diphenylamine and acetone, a low temperature reaction product of diphenylamine and acetone, a low temperature reaction product of diphenylamine, aniline and acetone, a reaction product of diphenylamine and diisobutylene, octylated diphenylamine, dioctylated diphenylamine, p,p'-dioctyl-diphenylamine and alkylated diphenylamine; and p-phenylenediamine aging preventing agents such as N,N'-diphenyl-p-phenylenediamine, n-propyl-N'-phenyl-p-phenylenediamine, N,N'-di-2-naphthyl-p-phenylenediamine, N-cyclohexyl-N'-phenyl-p-phenylenediamine, N-phenyl-N'-(3-methacryloyloxy-2-hydroxypropyl)-p-phenylenediamine, N,N'-bis(1-methylheptyl)-p-phenylene-diamine, N,N'-bis(1,4-dimethylpentyl)-p-phenylenediamine, N,N'-bis(1-ethyl-3-methylpentyl)-p-phenylenediamine, N-(1,3-dimethylbutyl)-N'-phenyl-p-phenylenediamine, phenyl, hexyl-p-phenylenediamine and phenyl, octyl-p-phenylenediamine.

Specific examples of the phenolic aging preventing agents include styrenated phenol, 2,6-di-t-butyl-4-methylphenol, 2,6-di-t-butyl-p-ethylphenol, 2,4,6-tri-t-butylphenol, butylhydroxyanisole, 1-hydroxy-3-methyl-4-isopropylbenzene, mono-t-butyl-p-cresol, mono-t-butyl-m-cresol, 2,4-dimethyl-6-t-butylphenol, butylated bisphenol A, 2,2'-methylene-bis-(4-methyl-6-t-butyl-phenol), 2,2'-methylene-bis-(4-ethyl-6-t-butylphenol), 2,2'-methylene-bis(4-methyl-6-t-nonylphenol), 2,2'-isobutylidene-bis-(4,6- dimethylphenol), 4,4'-butylidene-bis-(3-methyl-6-t-butylphenol), 4,4'-methylene-bis-(2,6-di-t-butyl-phenol), 2,2-thio-bis-(4-methyl-6-t-butylphenol), 4,4'-thio-bis-(3-methyl-6-t-butylphenol), 4,4'-thio-bis-(2-methyl-6-butylphenol), 4,4'-thio-bis-(6-t-butyl-3-methylphenol), bis (3-methyl-4-hydroxy-5-t-butylbenzene)sulfide, 2,2-thio-[diethyl-bis-3-(3,5-di-t-butyl-4-hydroxyphenol)propionate], bis[3,3-bis(4'-hydroxy-3'-t-butylphenol)butyric acid]glycol ester, bis[2-(2-hydroxy-5-methyl-3-t-butylbenzene)-4-methyl-6-t-butylphenyl]terephthalate, 1,3,5-tris(3',5'-di-t-butyl-4'-hydroxybenzyl)isocyanurate, N,N'-hexamethylene-bis(3,5-di-t-butyl-4-hydoxy-hydroxyamide), N-octadecyl-3-(4'-hydroxy-3',5'-di-t-butylphenol)propionate, tetrakis [methylene-(3',5'-di-t-butyl-4-hydroxyphenyl)propionate] methane, 1,1'-bis(4-hydroxyphenyl)cyclohexane, mono(α-methylbenzene)phenol, di((α-methylbenzyl)phenol, tri(α-methylbenzyl phenol, bis(2'-hydroxy-3'-t-butyl-5'-methylbenzyl)4-methyl-phenol, 2,5-di-t-amylhydroquinone, 2,6-di-t-butyl-α-dimethylamino-p-cresol, 2,5-di-t-butyl hydroquinone, a diethyl ester of 3,5-di-t-butyl-4-hydroxybenzylphosphoric acid, catechol and hydroquinone.

Specific examples of the sulfur-type aging preventing agents include 2-mercaptobenzimidazole, a zinc salt of 2-mercaptobenzimidazole, 2-mercaptomethylbenzoimidazole, a zinc salt of 2-mercaptomethybenzoimidazole, a zinc salt of 2-mercaptomethylimidazole, dimyristylthiodipropionate, dilaurylthiodipropionate, distearylthiodipropionate, ditridecylthiodipropionate, and pentaerythritol-tetrakis-(β-lauryl-thiopropionate).

These aging preventing agents may be used singly or as mixtures of at least two types.

The compounded amount of the aging preventing agent may usually be 0.1 to 10 parts by weight, preferably 0.5 to 5 parts by weight, per 100 parts by weight of the ethylene/α-olefin/non-conjugated polyene copolymer (A).

Foaming Agent

The rubber composition of the present invention can be formed with foaming, when it comprises such compounds making a foaming system as foaming agents, foaming assistants, etc.

As the foaming agents, those are normally used for forming rubbers with foaming, can be used. Examples of the foaming agents includes inorganic foaming agents such as sodium bicarbonate, sodium carbonate, ammonium bicarbonate, ammonium carbonate, ammonium nitrite; nitroso compounds such as N,N'-dimethyl-N,N'-dinitroso-terephthalamide, N,N'-dinitrosopentamethylene-tetramine; azo compounds such as azodicarbon amide, azobisisobutyronitrile, azocyclohexylnitrile, azodiaminobenzene, barium azodicarboxylate; sulfonyl hydrazido compounds such as benzene sulfonyl hydrazido, toluene sulfonyl hydrazido, p,p'-oxybis(benzene sulfonyl hydrazido), diphenyl sulfon-3,3'-disulfonyl hydrazido; azido compounds such as calcium azido,4,4-diphenyldisulfonyl azido, p-toluene sulfonyl azido.

Among them, nitroso compounds, azo compounds and azido compounds are preferred.

The foaming agents can be used in an amount of from 0.5 to 30 parts by weight, preferably from 1 to 20 parts by weight, per 100 parts by weight of the ethylene/α-olefin/polyene copolymer rubber (A). From the rubber compounds comprising the foaming agents in such an amount, a foamed article having an apparent specific gravity of 0.03 to 0.8 g/cm$^3$ can be produced.

A foaming assistant is also used with the foaming agent. When the foaming assistant is used, effects such as decreasing of decomposing temperature of the foaming agent, promoting of decomposing, uniforming of foams, can be obtained. Examples of the foaming assistants include organic acids such as salicylic acid, phthalic acid, stearic acid and oxalic acid; urea or its derivatives.

The foaming assistant can be used in an amount of from 0.01 to 10 parts by weight, preferably from 0.1 to 5 parts by weight, per 100 parts by weight of the ethylene/α-olefin/non-conjugated polyene copolymer rubber (A).

[Preparation of the Rubber Composition and Its Crosslinked Product]

To produce a crosslinked product from the rubber composition of the present invention, an non-crosslinked rubber composition is prepared as in usual crosslinking of a general rubber, and thereafter, the rubber composition is molded in an intended shape and thereafter the molded product may be crosslinked.

As a crosslinking method, since the rubber composition of the present invention contains the above-mentioned crosslinking agent, the rubber composition is heated.

The crosslinkable rubber composition of the present invention, for example, can be produced by the following method.

The components (A) to (D) and other additives may be kneaded by internal mixers such as a Bumbury's mixer, a kneader or an intermixer at a temperature of 80 to 170° C. for 3 to 10 minutes. Then, by using a roll such as an open roll or a kneader, and as required, a crosslinking promotor or a crosslinking aid, may be added to the kneaded mixture. The resulting mixture was then kneaded at a roll temperature of 40 to 80° C. for 5 to 30 minutes, and then sheeted. When the kneading temperature at the internal mixer was low, the crosslinking promotor may be kneaded simultaneously.

The crosslinkable rubber composition prepared as above may be molded into an intended shape by a molding method such as an extruding molding machine or a calender roll. Simultaneously with the molding, or the molded product is introduced into a crosslinking tank, and can be crosslinked. The crosslinking reaction may be performed by heating at a temperature of 120 to 270° C. for a time of 1 to 40 minutes.

The step of this crosslinking may be carried out by using a mold, or the crosslinking may be performed without using a mold. When a mold is not used, a step of crosslinking is performed.usually continuously. The method of heating in the crosslinking tank may be carried out by using a heating tank such as hot air, a glass bead flowing floor, UMF (ultrashort electromagnetic waves), steam or LCM (heat melt salt tank).

EXAMPLES

The present invention will be illustrated by the following Examples, but the invention will not be limited by the following Examples.

Ethylene/α-olefin/non-conjugated polyene copolymer rubber (A) used in the Examples are shown in Table 1.

TABLE 1

|  | Co-polymer 1 | Co-polymer 2 | Co-polymer 3 | Co-polymer 4 |
| --- | --- | --- | --- | --- |
| α-Olefin | propylene | 1-butene | propylene | propylene |
| Ethylene/α-olefin (mole ratio) | 60/40 | 70/30 | 58/42 | 62/38 |
| [η], dl/g | 2.3 | 2.4 | 2.3 | 2.4 |
| Non-conjugated diene | VNB (1) | VNB1 | — | BNB (2) |

TABLE 1-continued

|  | Co-polymer 1 | Co-polymer 2 | Co-polymer 3 | Co-polymer 4 |
|---|---|---|---|---|
| Content of non-conjugated diene (wt. %) | 1.9 | 1.1 | — | 1.6 |

(1) 5-vinyl-2-norbornene
(2) 5-(1-butenyl)-2-norbornene

Example 1

Each of the copolymers 1 shown in Table 1 was compounded in accordance with Table 2 to form a non-crosslinked compounded rubber.

That is, the copolymer 1, zinc flower, stearic acid, HAF carbon black, process oil and aging preventing agent were kneaded in 1.7 liter Bumbery's mixer for 5 minutes. By using an open roll, dicumyl peroxide and ethylene glycol dimethacrylate were kneaded with the resulting kneaded mixture, and the final kneaded mixture was sheeted to form a compounded rubber sheet having a thickness of 2 mm. At this time, the surface temperatures of the rolls were 50° C. at both a front roll and a rear roll. The front roll had a rotation number of 16 rpm and the rear roll had a rotation number of 18 rpm.

TABLE 2

|  | Parts by weight |
|---|---|
| Copolymer | 100 |
| Zinc flower | 5 |
| Stearic acid | 1 |
| HAF carbon black (Seast 3, produced by Tokai Carbon Co., Ltd.) | 50 |
| Paraffinic process oil (Samper 2280, produced by Japan Sun Petroleum Co., Ltd.) | 10 |
| Aging preventing agent (A) | 2 |
| Aging preventing agent (B) | 4 |
| Crosslinking agent (dicumyl peroxide) | 1.6 |
| Crosslinking aid (Ethylene glycol dimethacrylate; produced by Sanshin Chemical Co., Ltd.: Acrylester EG) | 2.3 |

Aging preventing agent (A): Pentaerythritol-tetrakis[3-(3, 5-di-t-butyl-4-hydroxyphenyl)pripionate] produced by Nippon Ciba Geigy Co., Ltd.:

Aging preventing agent (B): 2-Mercaptobenzimidazole (produced by Sanshin Chemical Co., Ltd.: Sandant MB).

The compounded rubber sheet obtained in the above manner was press-crosslinked at 170° C. for 10 minutes to obtain a crosslinked rubber sheet.

The resulting crosslinked rubber sheet was subjected to the following tests. The results are shown in Table 3.
[1] Roll Processability Test At the time when the crosslinking agent and the crosslinking aid were added and kneaded by using an 8-inch open roll having a roll width of 20 inch, the state of wrapping of the compound about the roll was observed with the naked eye.
[2] Tensile Test The crosslinked rubber sheet was punched out to prepare a No.3-type dumb-bell test specimen described in JIS K6301. According to the method defined in JIS K6301, No. 3, the tensile test was carried out under the conditions at a tensile speed of 500 mm/min. to measure a 300% modulus (M300), a tensile breaking stress (TB) and a tensile breaking elongation (EB).
[3] Hardness Test The hardness test was carried out in accordance with JIS K6301 by measuring a spring hardness Hs (JIS A) hardness.
[4] Aging Test An air heating aging test was carried out at 175° C. for 240 hours to measure a retention ratio AR (TB) and an elogation retention ratio AR (EB) of the above properties before the aging.
[5] Abrasion Resistance Test The abrasion resistance test was carried out according to JIS K6301 to perform a taper abrasion Specifically, the amount of abrasion was measured after 1000 rotations at a load of 0.25 Kgf.
[6] Bending Crack Growth Test The bending crack growth test was carried out in accordance with JIS K6301 by performing a bending test. Specifically, the number of bendings was measured until the cracks grew from 2 mm to 17 mm.

Example 2

The same procedure as in Example 1 was repeated except that instead of the copolymer 1 described in Example 1, the copolymer 2 shown in Table 1 was used.

The results are shown in Table 3.

Comparative Example 1

Example 1 was repeated except that instead of the copolymer 1 in Example 1, the copolymer 3 shown in Table 1 was used.

The results are shown in Table 3.

Comparative Example 2

Comparative Example 1 was repeated except that 2.8 parts of dicumyl peroxide and 4 parts of diethylene glycol dimethacrylate were used.

The results are shown in Table 3.

Example 3

Example 1 was repeated except that instead of the copolymer 1 in Example 1, the copolymer 4 shown in Table 1 was used.

The results are shown in Table 3.

TABLE 3

|  | Example 1 | Example 2 | Comp. Ex. 1 | Comp. Ex. 2 | Example 3 |
|---|---|---|---|---|---|
| Roll processability | good | good | good | — | good |
| Properties of crosslinked rubber |  |  |  |  |  |
| M300 [Mpa] | 6.7 | 7.1 | 2.8 | 7.4 | 6.9 |
| TB [Mpa] | 14.3 | 13.9 | 11.1 | 12.5 | 13.5 |
| EB [%] | 520 | 480 | 850 | 460 | 500 |
| Hs | 67 | 66 | 65 | 68 | 67 |
| Heat aging resistance |  |  |  |  |  |
| AR (TB) [%] | 75 | 80 | 35 | 62 | 77 |
| AR (EB) [%] | 79 | 84 | 52 | 68 | 80 |

TABLE 3-continued

| | Example 1 | Example 2 | Comp. Ex. 1 | Comp. Ex. 2 | Example 3 |
|---|---|---|---|---|---|
| Bending fatigue resistance 15 mm crack growth [times] | $7 \times 10^4$ | $3 \times 10^5$ | $>10^6$ | $5 \times 10^4$ | $2 \times 10^5$ |
| Abrasion resistance [g/1000 r] | 26 | 21 | 85 | 47 | 24 |

According to the present invention, the ethylene/α-olefin/non-conjugated polyene copolymer (A) having the specified component is combined with an organic peroxide (B), carbon black (C) and softening agent (D) to form a rubber composition for a conveyor belt.

By the present invention, the problems of the prior art are overcome, and there are provided a rubber composition for a conveyor belt and its crosslinked product having excellent heat resistance (heat aging resistance) and excellent abrasion resistance. This rubber composition is especially suitable for a usage of conveying a sintered product, a coke, a cement, a clinker, a quicklime, etc., since it has excellent mechanical strength, heat resistance (including heat aging resistance), abrasion resistance, additionally, roll processability.

What is claimed is:

1. A conveyor belt obtained by crosslinking a rubber composition for a conveyor belt, said composition comprising (A) 100 parts by weight of an ethylene/alpha-olefin containing 4 to 20 carbon atoms/non-conjugated polyene copolymer rubber, wherein the mole ratio of ethylene/alpha-olefin is from 65/35 to 73/27, and having a diene unit derived from a non-conjugated diene represented by the general formula (1)

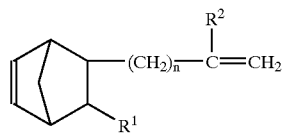
(1)

wherein n is an integer of 0 to 10, R¹ represents a hydrogen atom or an alkyl group containing 1 to 10 carbon atoms, and R² represents a hydrogen atom or an alkyl group containing 1 to 5 carbon atoms, or the general formula (2)

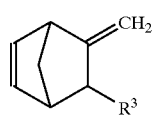
(2)

wherein R³ represents a hydrogen atom, or an alkyl group containing 1 to 10 carbon atoms, and wherein said copolymer rubber has an intrinsic viscosity (η), measured in decalin at 135° C., of 2 to 2.7 dl/g, (B) 0.5 to 15 parts by weight of an organic peroxide,
(C) 30 to 80 parts by weight of a carbon black, and
(D) 5 to 25 parts by weight of a softening agent.

2. A conveyor belt according to claim 1, wherein in the ethylene/alpha-olefin containing 4 to 20 carbon atoms/non-conjugated polyene copolymer rubber (A), the content of the non-conjugated polyene is in the range of 0.2 to 4% by weight.

3. A conveyor belt obtained by crosslinking a rubber composition for a conveyor belt said composition comprising (A) 100 parts by weight of an ethylene/α-olefin containing 4 to 20 carbon atoms/non-conjugated polyene copolymer rubber, wherein the mole ratio of ethylene/alpha-olefin is from 65/35 to 73/27, and having a diene unit derived from a non-conjugated diene represented by the general formula (1)

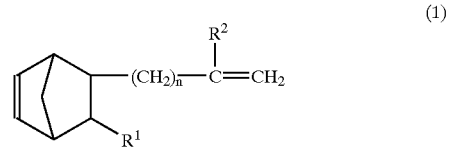
(1)

wherein "n" is an integer of 1 to 10, R¹ represents a hydrogen atom or an alkyl group containing 1 to 10 carbon atoms, and R² represents a hydrogen atom or an alkyl group containing 1 to 5 carbon atoms, or by the general formula

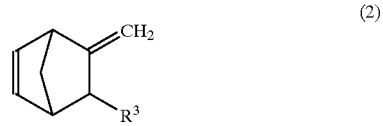
(2)

wherein R³ represents a hydrogen atom, or an alkyl group containing 1 to 10 carbon atoms, and wherein said copolymer rubber has an intrinsic viscosity (η), measured in decalin at 135° C., of 2 to 2.7 dl/g, (B) 0.5 to 15 parts by weight of an organic peroxide,
(C) 30 to 80 parts by weight of a carbon black,
(D) 5 to 25 parts by weight of a softening agent, and
(E) a crosslinking aid in an amount of 0.5 to 2 moles per 1 mole of the organic peroxide.

4. A conveyor belt obtained by crosslinking a rubber composition for a conveyor belt, said composition comprising (A) 100 parts by weight of an ethylene/alpha-olefin containing 4 to 20 carbon atoms/non-conjugated polyene copolymer rubber, wherein the mole ratio of ethylene/alpha-olefin is from 65/35 to 73/27, and having a diene unit derived from a non-conjugated diene represented by the general formula (1)

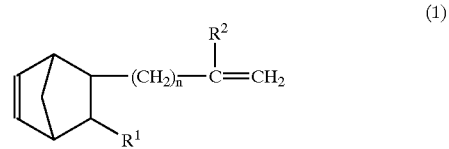
(1)

wherein n is an integer of 1 to 10, R¹ represents a hydrogen atom or an alkyl group containing 1 to 10 carbon atoms, and R² represents a hydrogen atom or an alkyl group containing 1 to 5 carbon atoms, wherein in the ethylene/α-olefin containing 4 to 20 carbon atoms/non-conjugated polyene copolymer rubber (A)(i) the content of the non-conjugated polyene is in the range of 0.2 to 4% by weight, and (ii) the intrinsic viscosity (η), measured in decalin at 1350° C., is in the range of 2 to 2.7 dl/g, (B) 0.5 to 15 parts by weight of an organic peroxide, (C) 30 to 80 parts by weight of a carbon black, and (D) 5 to 25 parts by weight of a softening agent.

5. The conveyor belt according to claim 4, wherein in the ethylene/á-olefin containing 4 to 20 carbon atoms/non-conjugated polyene copolymer rubber (A), and the alpha-olefin is 1-butene.

6. A conveyor belt obtained by crosslinking a rubber composition for a conveyor belt, said composition comprising (A) 100 parts by weight of an ethylene/alpha-olefin containing 4 to 20 carbon atoms/non-conjugated polyene copolymer rubber, wherein the mole ratio of ethylene/alpha-olefin is from 65/35 to 73/27, and having a diene unit derived from a non-conjugated diene represented by the general formula (2)

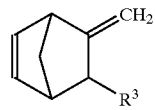
(2)

wherein $R^3$ represents a hydrogen atom, or an alkyl group containing 1 to 10 carbon atoms, wherein in the ethylene/α-olefin containing 4 to 20 carbon atoms/non-conjugated polyene copolymer rubber (A) (i) the content of the non-conjugated polyene is in the range of 0.2 to 4% by weight, and (ii) the intrinsic viscosity (η), measured in decalin at 135° C., is in the range of 2 to 2.7 dl/g, (B) 0.5 to 15 parts by weight of an organic peroxide, (C) 30 to 80 parts by weight of a carbon black, and (D) 5 to 25 parts by weight of a softening agent.

7. The conveyor belt according to claim 4, wherein in the ethylene/á-olefin containing 4 to 20 carbon atoms/non-conjugated polyene copolymer rubber (A), the alpha-olefin is 1-butene, the non-conjugated polyene is 5-vinyl-2-norbornene, and the conveyor belt rubber composition has a heat aging resistance value of at least 80.

* * * * *